United States Patent [19]

Williams et al.

[11] Patent Number: 5,501,533
[45] Date of Patent: Mar. 26, 1996

[54] ROLLER BEARING ASSEMBLY HAVING IMPROVED AXIAL RETENTION AND ANGULAR CLOCKING

[75] Inventors: Richard R. Williams, Pohatcong Township, N.J.; Peter C. Preston, Oshkosh, Wis.; Willard C. Macfarland, Jr., Goshen, Conn.

[73] Assignee: Roller Bearing Company of America, Newtown, Pa.

[21] Appl. No.: 497,735

[22] Filed: Jun. 3, 1995

[51] Int. Cl.⁶ .......................... F16C 33/46; F16C 33/58; F16C 43/04
[52] U.S. Cl. .......................... 384/572; 384/560; 384/564
[58] Field of Search .................. 384/572, 576, 384/585, 906, 560, 564

[56] References Cited

U.S. PATENT DOCUMENTS

| | | | |
|---|---|---|---|
| Re. 28,431 | 5/1975 | Alling et al. | 384/621 |
| 1,247,288 | 11/1917 | Laycock | 384/561 |
| 2,236,481 | 3/1941 | Storz | 384/462 |
| 2,712,480 | 7/1955 | Synek | 384/459 |
| 2,818,313 | 12/1957 | Gales | 384/564 |
| 2,890,083 | 6/1959 | Kampmeier | 384/52 |
| 2,969,266 | 1/1961 | Schaeffler | 384/564 |
| 3,051,534 | 8/1962 | Kohler et al. | 384/576 |
| 3,102,760 | 9/1963 | Aho | 384/575 |
| 3,144,284 | 8/1964 | Ortegren | 384/574 |
| 3,291,542 | 12/1966 | North | 384/55 |
| 3,405,981 | 10/1968 | Scheifele | 384/477 |
| 3,420,589 | 1/1969 | Green et al. | 384/620 |
| 3,713,713 | 1/1973 | Alling et al. | 384/622 |
| 3,794,393 | 2/1974 | Hord et al. | 384/558 |
| 3,850,485 | 11/1974 | Zimmer et al. | 384/558 |
| 3,900,235 | 8/1975 | Alling et al. | 384/622 |
| 3,945,692 | 3/1976 | Tsujiuchi | 384/120 |
| 3,994,546 | 11/1976 | Alling | 384/623 |
| 4,029,367 | 6/1977 | Schwede et al. | 384/2 |
| 4,032,201 | 6/1977 | Jones | 384/574 |
| 4,366,996 | 1/1983 | Grandel | 384/548 |
| 4,627,330 | 12/1986 | Beck, Jr. | 384/576 X |
| 4,699,529 | 10/1987 | Scholl et al. | 384/560 |
| 4,702,628 | 10/1987 | Watanabe | 384/580 |
| 4,869,604 | 9/1989 | Hill | 384/564 X |
| 4,874,260 | 10/1989 | Podhajecki | 384/470 |
| 4,907,898 | 3/1990 | Dickinson | 384/572 X |
| 4,997,353 | 3/1991 | Sakamaki et al. | 384/112 X |
| 5,002,406 | 3/1991 | Morton et al. | 384/477 |
| 5,007,746 | 4/1991 | Matzelle et al. | 384/420 |
| 5,011,390 | 4/1991 | Sakamaki et al. | 384/112 X |
| 5,030,074 | 7/1991 | Sakamaki et al. | 384/112 X |
| 5,044,788 | 9/1991 | Murphy et al. | 384/572 X |
| 5,207,512 | 5/1993 | Grant et al. | 384/906 X |
| 5,234,274 | 8/1993 | Honda et al. | 384/574 |

*Primary Examiner*—Thomas R. Hannon
*Attorney, Agent, or Firm*—Sperry, Zoda & Kane

[57] ABSTRACT

A roller bearing assembly having an inner raceway member and an outer raceway member defining an inner raceway bearing surface and an outer raceway bearing surface spaced from one another. Both members are preferably annular and have a bearing cage member positioned therebetween for retaining a plurality of individual cylindrically shaped roller bearings therein. The bearing cage member includes a peripherally extending rim adapted to extend into a peripheral groove defined in the outer race member for maintaining axial retention therebetween. The inner race member includes an inner race shoulder adjacent the inner race bearing surface and extending outwardly therefrom beyond the outer race bearing surface for facilitating axial retention of the inner race member. A clocking tab may be defined on the peripheral rim adapted to extend into a clocking slot defined in the peripheral slot to facilitate angular orientation or clocking between the bearing cage member and the outer race member.

16 Claims, 4 Drawing Sheets

ROLLER BEARING ASSEMBLY HAVING IMPROVED AXIAL RETENTION AND ANGULAR CLOCKING

BACKGROUND OF THE INVENTION

1. Field Of The Invention

The present invention deals with the field of devices for providing bearings normally comprising two annular members designed to provide freedom of rotational movement between two members. One of the members normally is positioned extending through an inner aperture defined within the inner bearing race member and the other device is adapted to be secured to the external surface of the outer race member.

More particularly the present invention is pertinent to such bearing assemblies utilizing roller bearings and in this particular application provides a novel means for axial retention and angular clocking of the individual parts of the roller bearing assembly.

2. Description Of The Prior Art

Many different designs have been utilized to achieve similar roller bearing assembly configurations such as that shown in U.S. Pat. No. 1,247,288 patented Nov. 20, 1917 to A. Laycock on a "Roller-Bearing"; and U.S. Pat. No. 2,236,481 patented Mar. 25, 1941 to O. Storz and assigned to McGill Manufacturing Company on a "Self-Contained Roller Bearing"; and U.S. Pat. No. 2,712,480 patented Jul. 5, 1955 to V. Synek and assigned to SKF Industries, Inc. on "Axle Boxes"; and U.S. Pat. No. 2,818,313 patented Dec. 31, 1957 to R. J. Gales and assigned to Orange Roller Bearing Company on a "Roller Bearing"; and U.S. Pat. No. 2,890,083 patented Jun. 9, 1959 to F. J. Kampmeier and assigned to The Ingersoll Milling Machine Company on a "Guide Construction"; and U.S. Pat. No. 3,051,534 patented Aug. 28, 1962 to T. B. Kohler et al and assigned to Federal-Mogul-Bower Bearings on a "Bearing Cage Assembly"; and U.S. Pat. No. 3,102,760 patented Sep. 3, 1963 to E. Aho and assigned to Federal-Mogul-Bower Bearings on a "Cage For Straight Roller Bearing"; and U.S. Pat. No. 3,144,284 patented Aug. 11, 1964 to H. A. Ortegren and assigned to Federal-Mogul-Bower Bearings, Inc. on a "Retainer Ring And Roller Bearing Assembly"; and U.S. Pat. No. 3,291,542 patented Dec. 13, 1966 to H. W. North and assigned to Birdsboro Corporation on a "Journal Bearing"; and U.S. Pat. No. 3,405,981 patented Oct. 15, 1968 to H. B. Scheifele and assigned to Federal-Mogul Corporation on a "Cage And Bearing Assembly Construction"; and U.S. Pat. No. 3,420,589 patented Jan. 7, 1969 to W. F. Green et al and assigned to Timken Roller Bearing Company on a "Unitized Tapered Roller Bearing"; and U.S. Pat. No. 3,713,713 patented Jan. 30, 1973 to R. Alling et al and assigned to The Torrington Company on a "Lanced Tab Race"; and U.S. Pat. No. 3,794,393 patented Feb. 26, 1974 to C. Hurd et al and assigned to Borg-Warner Corporation on a "Roller Bearing Assembly"; and U.S. Pat. No. 3,850,485 patented Nov. 26, 1974 to G. Zimmer et al and assigned to Borg-Warner Corporation on a "Bearing Assembly"; and U.S. Pat. No. Re. 28,431 reissued May 27, 1975 to R. Alling et al and assigned to The Torrington Co. on a "Lanced Tab Race"; and U.S. Pat. No. 3,900,235 patented Aug. 19, 1975 to R. Alling et al and assigned to The Torrington Company on a "Tab Race"; and U.S. Pat. No. 3,945,692 patented Mar. 23, 1976 to T. Tsujiuchi and assigned to Toyoda-Koki Kabushiki Kaisha on a "High Rigidity Fluid Bearing And Method For Manufacturing The Same"; and U.S. Pat. No. 3,994,546 patented Nov. 30, 1976 to R. Alling and assigned to The Torrington Company on a "Thrust Bearing With Locking Tabs"; and U.S. Pat. No. 4,032,201 patented Jun. 28, 1977 to A. Jones and assigned to S. J. Agnew on a "Roller Bearing Assembly"; and U.S. Pat. No. 4,366,996 patented Jan. 4, 1983 to L. Grandel and assigned to General Motors Corporation on a "Needle Bearing Wear Reduction Arrangement"; and U.S. Pat. No. 4,699,529 patented Oct. 13, 1987 to H. Scholl et al and assigned to SKF GmbH on a "Radial Roller Bearing"; and U.S. Pat. No. 4,702,628 patented Oct. 27, 1987 to H. Watanabe and assigned to Nippon Thomson Co., Ltd. on a "Roller Bearing Assembly"; and U.S. Pat. No. 4,874,260 patented Oct. 17, 1989 to S. Podhajecki and assigned to The Torrington Company on "Cage Outer Diameter Profile"; and U.S. Pat. No. 4,997,353 patented Mar. 5, 1991 to H. Sakamaki et al and assigned to Eagle Industry Co., Ltd. on a "Vane Pump With Dynamic Pressure Bearing Grooves On Vane Guide Ring"; and U.S. Pat. No. 5,002,406 patented Mar. 26, 1991 to J. Morton et al and assigned to Emerson Electric Co. on a "Sealing Structure For A Spherical Bearing Assembly"; and U.S. Pat. No. 5,007,746 patented Apr. 16, 1991 to A. Matzelle et al and assigned to Federal-Mogul Corporation on a "Thrust Bearing With Resilient Retention Tang"; and U.S. Pat. No. 5,011,390 patented Apr. 30, 1991 to H. Sakamaki et al and assigned to Eagle Industry Co., Ltd. on a "Rotary Vane Machine Having Stopper Engaging Recess In Vane Means"; and U.S. Pat. No. 5,030,074 patented Jul. 9, 1991 to H. Sakamaki et al and assigned to Eagle Industry Co., Ltd. on a "Rotary Machine With Dynamic Pressure Bearing Grooves On Vane Guide Ring"; and U.S. Pat. No. 5,234,274 patented Aug. 10, 1993 to A. Honda et al and assigned to NSK Ltd. on a "Self-Aligning Roller Bearing With Retainer.

SUMMARY OF THE INVENTION

The present invention provides a roller bearing assembly with a unique means for axial retention and angular clocking. An inner race member is included which is normally of a generally annular shape and includes a convex exterior surface on the outside of the annular shape. The inner race member preferably defines an inner race bearing surface defined on this convex exterior surface and also includes a inner race shoulder member extending outwardly adjacent the inner race bearing surface.

The bearing assembly also includes an outer race member which is generally annular and includes a concave interior surface thereon such that it extends around the inner race member and is spatially disposed therefrom. This outer race member defines an outer race bearing surface on the concave interior surface spatially disposed from and facing the inner race bearing surface. This outer race member preferably includes a peripheral groove extending therearound such as a machined peripheral groove therein. This peripheral groove also preferably includes a clocking slot defined therein. This groove is positioned to be engageable with respect to the inner race shoulder member to facilitate axial retention and orientation of the inner race member with respect to the outer race member. This outer race member preferably defines a locating pin bore therein.

A bearing cage member is defined which is positioned between the inner race bearing surface of the inner race member and the outer race bearing surface of the outer race member. This bearing cage member is preferably made of a nylon material reinforced with glass fibers which are embedded within the nylon, but the bearing cage could be made a many other materials but preferably some type of plastic material. The bearing cage defines a plurality of bearing containment chambers therein each preferably being capable of retaining two individual roller bearing members therein. The bearing cage member includes a peripheral rim adapted to be positioned extending into the peripheral groove to facilitate axial retention of the bearing cage member with respect to the outer race member. The peripheral rim preferably includes a clocking tab extending outwardly therefrom which is engageable with the clocking slot in order to selectively maintain a angular clocking relationship between the bearing cage member and the outer race member which may be a fixed position or may vary through a given range of distance determined by the clearance between the clocking tab and the clocking slot.

A plurality of roller bearing members are also included positioned retained within the bearing containment chambers defined in the bearing cage member itself. Each of these bearing containment chambers are adapted to retain two of the roller bearing members therein. The roller bearing members are rotatably movable with respect to the bearing cage member. The roller bearing members are also positioned in abutment with respect to the inner race bearing surface of the inner race member as well as in abutment with respect to the outer race bearing surface of the outer race member in order to facilitate relative movement between the inner race member and the outer race member and to allow rotation of the roller bearing members positioned within the chambers of the bearing cage member therebetween.

A locating pin may also be included which is positioned within the locating pin bore in the outer race member and extends outwardly therefrom into engagement with respect to the surrounding environmental structure for securement of the outer race member thereto.

It is an object of the present invention to provide a roller bearing assembly having improved axial retention and angular clocking wherein cost of materials is minimized.

It is an object of the present invention to provide a roller bearing assembly having improved axial retention and angular clocking wherein cost of assembly is minimized.

It is an object of the present invention to provide a roller bearing assembly having improved axial retention and angular clocking wherein a bearing cage member can be used formed of a molded plastic material.

It is an object of the present invention to provide a roller bearing assembly having improved axial retention and angular clocking wherein the outer race member can be secured to surrounding environmental structure by a locating pin.

It is an object of the present invention to provide a roller bearing assembly having improved axial retention and angular clocking wherein axial retention of an inner raceway member is simultaneously achieved by axial retention of the outer raceway member.

It is an object of the present invention to provide a roller bearing assembly having improved axial retention and angular clocking wherein axial retention of the bearing cage member is achieved by axial retention of the outer race member.

It is an object of the present invention to provide a roller bearing assembly having improved axial retention and angular clocking wherein rotationally angular clocking is achieved by a clocking tab defined on the bearing cage adapted to extend into a clocking slot defined in the outer race member.

It is an object of the present invention to provide a roller bearing assembly having improved axial retention and angular clocking wherein angular movement of the bearing cage with respect to the outer race member in response to oscillating movement of the bearing is controlled by the angular clearance between a clocking tab and a clocking slot.

It is an object of the present invention to provide a roller bearing assembly having improved axial retention and angular clocking wherein a heavy rim of the bearing cage is trapped between the inner raceway and the outer raceway.

It is an object of the present invention to provide a roller bearing assembly having improved axial retention and angular clocking wherein axial retention and angular clocking of a molded plastic cage and roller bearing segment is achieved with respect to an outer race segment.

It is an object of the present invention to provide a roller bearing assembly having improved axial retention and angular clocking wherein maintenance costs are minimized.

It is an object of the present invention to provide a roller bearing assembly having improved axial retention and angular clocking wherein bearing failures are significantly minimized.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
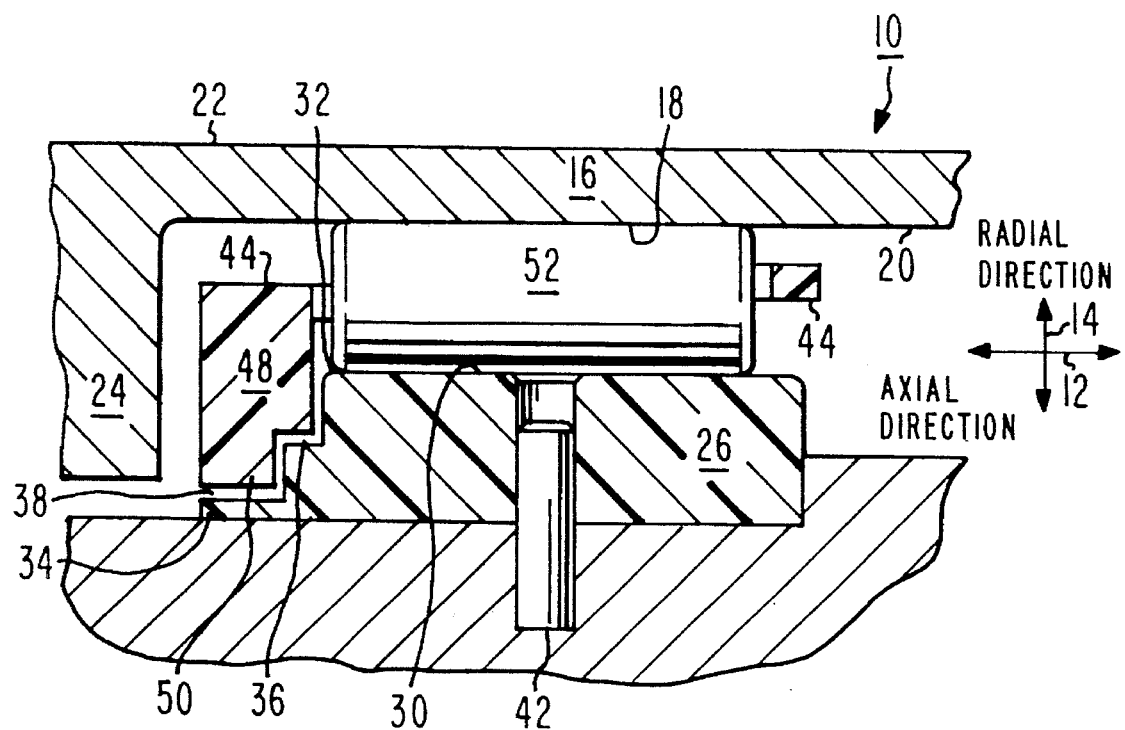
FIG. 1 is a cross-section of an embodiment of a roller bearing assembly of the present invention.

The present invention provides a roller bearing assembly 10 which is designed to provide an inner race member 16 and an outer race member 26 which can preferably each be of generally annular shape to provide bearing movement relative between two parts.

Preferably the inner race member 16 defines an inner race bearing surface 18 on an external convex surface 20 thereof. Also the inner race member 16 preferably defines an inner aperture 22 extending therethrough for holding a movable part therein. The outer race member 26 preferably includes an outer race bearing surface 30 preferably on the concave interior surface 32 thereof which is positioned oriented facing the inner race member 16 and spaced therefrom.

The inner race member 16 of the present invention preferably includes an inner race shoulder member 24 extending peripherally therearound at a position adjacent to inner race bearing surface 18. This inner race shoulder member 24 is positioned to extend outwardly from said inner race member 16 to a position radially beyond the outer race bearing surface 30 as shown best in FIG. 1 to facilitate axial retainment between the inner race member 16 and the outer race member 26.

That is, if the outer race member 26 is retained with respect to the surrounding environment such as by a locating pin 42 extending into a locating pin bore 40 defined within the outer race member 26 and into the surrounding environmental structure as shown on FIG. 1, then simultaneous retaining of both the inner and outer race members 16 and 26, respectively, will be achieved.

The outer race bearing surface 30 can also define a peripheral groove means 36 therein. Outer race member 26 can also define a groove housing 34 therein which defines the peripheral groove 36 extending therearound. The peripheral groove 36 can comprise a groove machined into the outer race bearing surface 30. In some configurations this peripheral groove 36 will also define a clocking slot 38 therein.

A bearing cage member 44 can be positioned between the inner race bearing surface 18 and the outer race bearing surface 30. Bearing cage member 44 can be of any material but preferably can be made of a molded plastic material. This bearing cage member 44 also includes a plurality of bearing containment chambers 46 defined therein each being adapted preferably to receive two cylindrically shaped roller bearing members 52 therein. These said roller bearing members are preferably each of a cylindrical shape.

The bearing cage member 44 also preferably includes a peripheral rim means 48 extending therearound. This peripheral rim 48 is designed to extend into the machined peripheral groove 36 of the outer race member 26 in order to be axially retained by positive engagement therein. Thus, with the locating pin 42 positioned in the locating pin bore 40 of the outer race member 26 and also the positioning of the locating pin 42 within the surrounding environmental structure, axial retention of the outer race member 26 will be achieved simultaneously with axial retention of the bearing cage member 44 due to the fact that the peripheral rim 48 thereof extends into the peripheral groove 36 of the outer race member 26.

Figure 2:
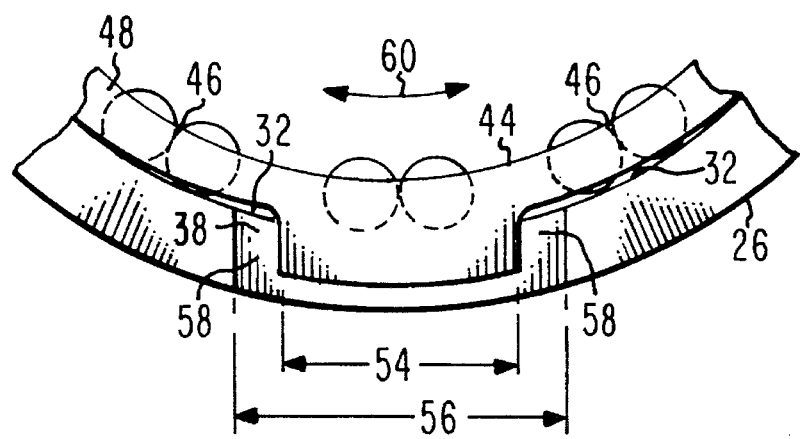
FIG. 2 is a side cross-sectional view of the embodiment shown in FIG. 1.
Figure 3:
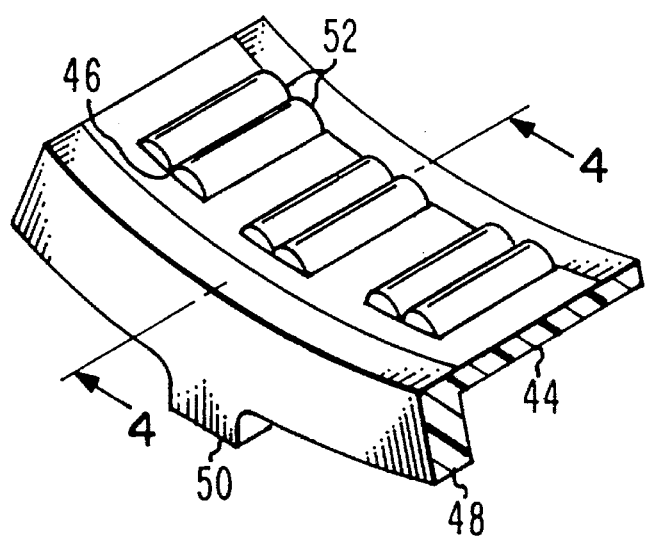
FIG. 3 is a perspective illustration of an embodiment of the bearing cage member of the present invention.
Figure 4:
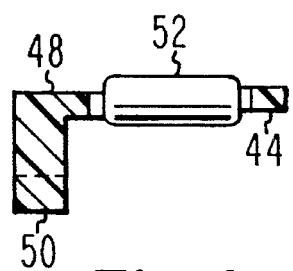
FIG. 4 is a cross-sectional view of an embodiment of the bearing cage member of the present invention.

Angular orientation or clocking of the bearing cage member 44 can be achieved with respect to the outer race member 26 by the inclusion of a clocking tab 50 extending outwardly from the peripheral rim 48. This clocking tab 50 is adapted to extend into the clocking slot 38 defined within the peripheral groove 36. As best shown in FIG. 2 this clocking tab 50 when extending into the clocking slot 38 will provide angular clocking as desired. The amount of movement of the clocking tab 50 within the clocking slot 38 is achieved by control of the clocking slot clearance 58 which is defined as the difference between the angular length 56 of the clocking slot 38 and the angular length 54 of the clocking tab 50 as shown in the detail of FIG. 2. With bearings used for oscillating movement as shown by oscillation arrow 60, the clocking tab 50 will allow some limited angular movement of the bearing cage member 44 with respect to the outer race member 26 depending directly upon the size of the clocking slot clearance 58. Thus, with such oscillating movement of the environmental structure, the bearing will allow some limited independent oscillating movement of the bearing cage 44 with respect to the outer race member 26.

Figure 5:
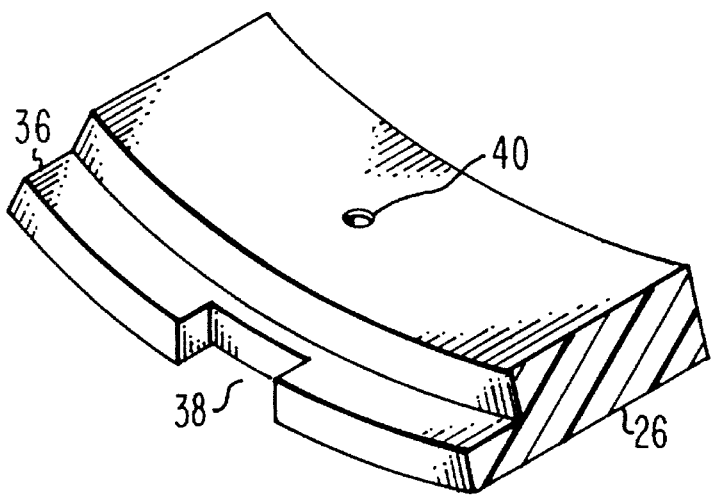
FIG. 5 is a perspective view of an embodiment of the outer race member of the present invention.
Figure 6:
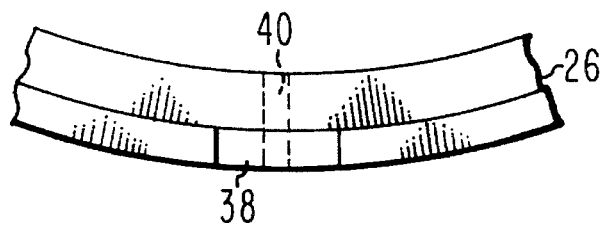
FIG. 6 is a side plan view of FIG. 5.
Figure 7:
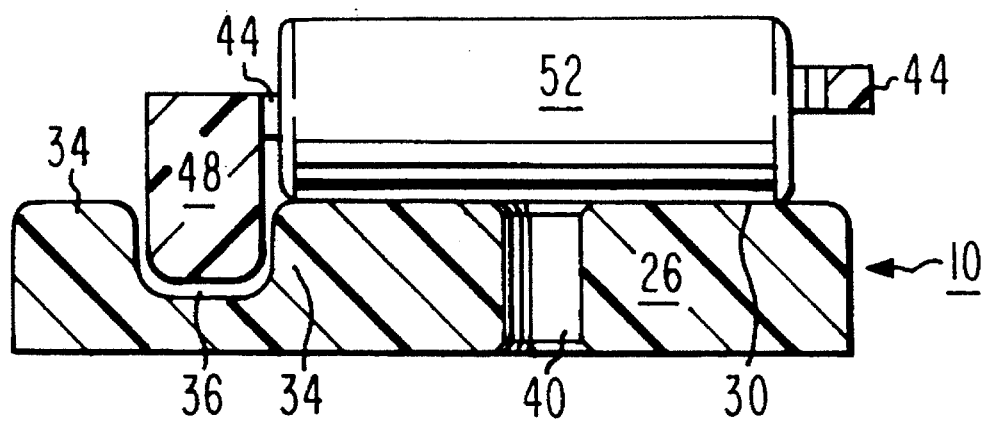
FIG. 7 is a cross-sectional view of an alternative embodiment of the roller bearing assembly of the present invention.
Figure 8:
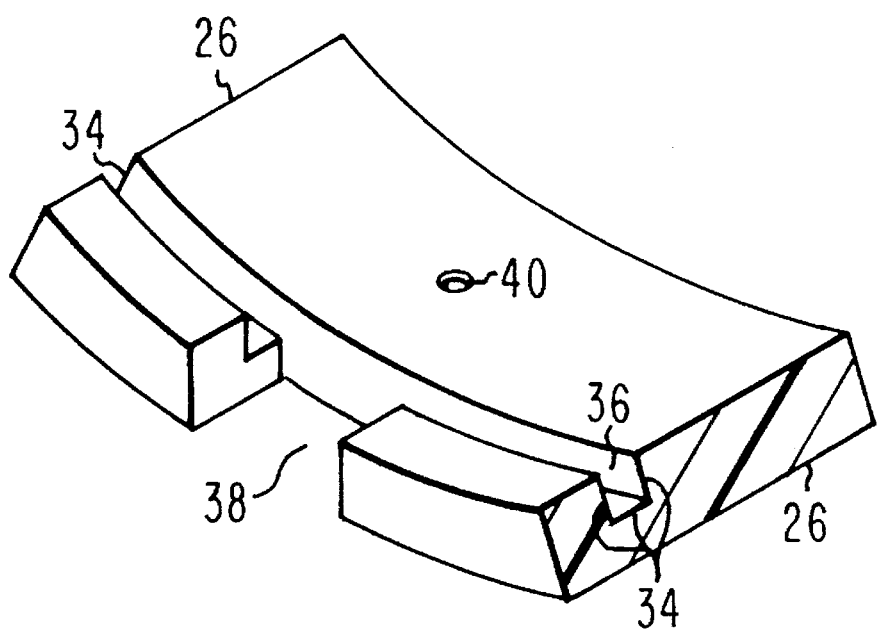
FIG. 8 is a perspective illustration of an alternative embodiment of the roller bearing assembly of the present invention.
Figure 10:
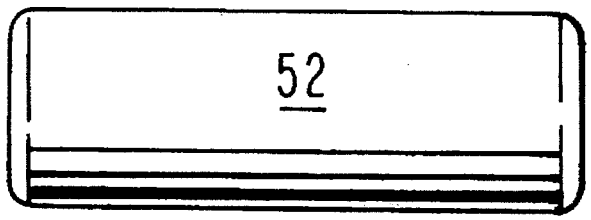
FIG. 10 is a side plan view of an embodiment of a roller bearing as used with the present invention.
Figure 11:
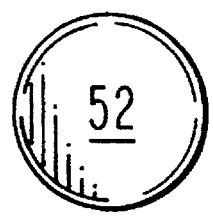
FIG. 11 is a side plan view of the embodiment of the roller bearing shown in FIG. 9.
Figure 9:
FIG. 9 is a cross-sectional view of the bearing cage member of the present invention shown with the roller bearing removed therefrom.

FIG. 7 shows an embodiment of the present invention utilized without the angular clocking tab or the angular clocking slot. With this configuration clocking is not achievable, however, axial retention is achieved by positioning of the peripheral rim 48 within the peripheral groove 36. Here we see the peripheral groove 36 extending completely surrounding the rim 48. In an alternative configuration as shown in FIGS. 1 and 5, the peripheral rim 48 can be retained in position between the inner race shoulder 24 and the outer race member 26. Thus, the exact configuration of the peripheral groove 36 may take the form of the L-shaped groove shown in FIG. 1 or the U-shaped groove shown in FIG. 8. The configuration in FIG. 1 includes the clocking tab 50 and clocking slot 38 and such structure is not shown in the configuration of FIG. 7 since that design does not include the clocking option.

As such, in the configuration of the present invention we see that axial retention of the outer race member 26, such as by a locating pin 42, will simultaneously achieve axial retention of the bearing cage member 44 because peripheral rim 48 thereof is positioned extending into the peripheral groove 36 of outer race member 26. Furthermore, the inner race member 16 will be axially retained by axial retainment of outer race member 26 and bearing cage 44 because the inner race shoulder member extends radially outwardly from the inner race bearing surface to a position beyond the outer race bearing surface 30 of the outer race member 26. This simultaneous mutual axial retention of members 16, 26 and 44 great facilitates use of this bearing design in many universal applications. Since this configuration can be used on applications requiring clocking control, the universal uses for this bearing design are even greater.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

We claim:

1. A roller bearing assembly having improved axial retention and angular clocking comprising:

A. an inner race member defining a inner race bearing surface thereon, said inner race member including an inner race shoulder member positioned adjacent said inner race bearing surface and extending outwardly therefrom;

B. an outer race member extending around said inner race member and being spatially disposed therefrom, said outer race member defining an outer race bearing surface spatially disposed from and facing said inner race bearing surface, said outer race member defining a peripheral groove means extending therearound, said inner race shoulder member extending outwardly from said inner race bearing surface beyond said outer race bearing surface to facilitate axial retention of said inner race member with respect to said outer race member;

C. a bearing cage member positioned between said inner race bearing surface of said inner race member and said outer race bearing surface of said outer race member, said bearing cage member defining a plurality of bearing containment chambers therein, said bearing cage member including a peripheral rim means adapted to be positioned extending into said peripheral groove means to facilitate axial retention of said bearing cage member with respect to said outer race member; and D. a plurality of roller bearing members positioned retained within said bearing containment chambers defined within said bearing cage member, said roller bearing members being rotatable moveable with respect to said bearing cage member, said roller bearing members being in abutment with respect to said inner race bearing surface of said inner race member and in abutment with said outer race bearing surface of said outer race member to facilitate relative movement between said inner race member and said outer race member by rotation of said roller bearing members positioned within said bearing cage member therebetween.

2. A roller bearing assembly having improved axial retention and angular clocking as defined in claim 1 wherein said peripheral groove means defines a clocking slot means therein and wherein said peripheral rim means includes a clocking tab means extending outwardly therefrom, said clocking tab means adapted to extend outwardly within said peripheral groove means into said clocking slot means in order to control angular orientation and movement between said bearing cage member and said outer race member.

3. A roller bearing assembly having improved axial retention and angular clocking as defined in claim 2 wherein said clocking slot means is larger than said clocking tab means to allow oscillating movement thereof within said clocking slot means responsive to oscillating movement of said bearing cage member with respect to said outer race member.

4. A roller bearing assembly having improved axial retention and angular clocking as defined in claim 2 wherein the extent of angular movement of said bearing cage member with respect to said outer race member is determined by the relative angular size of said clocking tab means relative to the angular size of said clocking slot means.

5. A roller bearing assembly having improved axial retention and angular clocking as defined in claim 1 wherein said inner race member is annular and defines an inner aperture extending therethrough.

6. A roller bearing assembly having improved axial retention and angular clocking as defined in claim 5 wherein said inner race bearing surface is convex and is defined on the exterior of said inner race member.

7. A roller bearing assembly having improved axial retention and angular clocking as defined in claim 1 wherein said outer race member is annular.

8. A roller bearing assembly having improved axial retention and angular clocking as defined in claim 7 wherein said outer race bearing surface is concave on the interior of the annular shape of said outer race member.

9. A roller bearing assembly having improved axial retention and angular clocking as defined in claim 1 further including a locating pin means secured to said outer race member and extending outwardly therefrom to facilitate securement to surrounding environmental structure.

10. A roller bearing assembly having improved axial retention and angular clocking as defined in claim 9 wherein said outer race member defines a locating pin bore therein adapted to receive said locating pin means positioned extending therein for securement thereof with respect to said outer race member for retainment therebetween.

11. A roller bearing assembly having improved axial retention and angular clocking as defined in claim 1 wherein said peripheral groove means comprises a machined groove adapted to receive said peripheral rim means extending therein for maintaining alignment between said bearing cage member and said outer race member and for maintaining axial retention therebetween.

12. A roller bearing assembly having improved axial retention and angular clocking as defined in claim 1 wherein said roller bearing member is cylindrical in shape.

13. A roller bearing assembly having improved axial retention and angular clocking as defined in claim 1 wherein said bearing cage member is of a plastic material.

14. A roller bearing assembly having improved axial retention and angular clocking as defined in claim 1 wherein each of said bearing containment chambers is capable of retaining two of said roller bearing members therein immediately adjacent to one another.

15. A roller bearing assembly having improved axial retention and angular clocking as defined in claim 1 wherein said peripheral rim means of said bearing cage member is positioned between said inner race shoulder of said inner race member and said peripheral groove means of said outer race member for maintaining axial retention of said inner race member, said bearing cage means and said outer race member with respect to one another.

16. A roller bearing assembly having improved axial retention and angular clocking comprising:

A. an inner race member being generally annular in shape and including a convex exterior surface thereon, said inner race member defining a inner race bearing surface on said convex exterior surface, said inner race member including an inner race shoulder member adjacent said inner race member and extending outwardly therefrom;

B. an outer race member being generally annular in shape and including a concave interior surface thereon and extending around said inner race member spatially disposed therefrom, said outer race member defining an outer race bearing surface on said concave interior surface spatially disposed from and facing said inner race bearing surface, said outer race member defining a peripheral groove means extending therearound, said peripheral groove means comprising a machined groove and defining a clocking slot means therein, said inner race shoulder member extending outwardly from said inner race bearing surface to a location beyond said outer race bearing surface to facilitate axial retention of said inner race member with respect to said outer race member, said outer race member defining a locating pin bore means therein;

C. a bearing cage member positioned between said inner race bearing surface of said inner race member and said outer race bearing surface of said outer race member, said bearing cage member being made of a plastic material and defining a plurality of bearing containment chambers therein each being capable of retaining two roller bearing members therein, said bearing cage member including a peripheral rim means adapted to be positioned extending into said peripheral groove means to facilitate axial retention of said bearing cage member with respect to said outer race member, said peripheral rim means including a clocking tab means extending outwardly therefrom and being engageable with respect to said clocking slot means in order to control the angular clocking position between said bearing cage member and said outer race member;

D. a plurality of roller bearing members positioned retained within said bearing containment chambers defined within said bearing cage member, each of said bearing containment chambers adapted to retain two of said roller bearing members therein, said roller bearing members being rotatable moveable with respect to said bearing cage member, said roller bearing members being in abutment with respect to said inner race bearing surface of said inner race member and in abutment with said outer race bearing surface of said outer race member to facilitate relative movement between said inner race member and said outer race member and rotation of said roller bearing members positioned within said bearing cage member therebetween; and E. a locating pin means positioned within said locating pin bore means and extending outwardly therefrom into engagement with surrounding environmental structure for securement of said outer race member thereto.

\* \* \* \* \*

UNITED STATES PATENT AND TRADEMARK OFFICE
CERTIFICATE OF CORRECTION

PATENT NO. : 5,501,533
DATED : March 26, 1996
INVENTOR(S) : Richard R. Williams, Peter C. Preston
Willard C. Macfarland, Jr.

It is certified that error appears in the above-identified patent and that said Letters Patent is hereby corrected as shown below:

Change the filing date from "Jun." to -- July --.

Signed and Sealed this

Twenty-seventh Day of August, 1996

Attest:

BRUCE LEHMAN

*Attesting Officer*          *Commissioner of Patents and Trademarks*